United States Patent
Kunitz et al.

(10) Patent No.: US 8,024,582 B2
(45) Date of Patent: Sep. 20, 2011

(54) ENCRYPTION OF DATA TO BE STORED IN AN INFORMATION PROCESSING SYSTEM

(75) Inventors: Hardy Kunitz, Graftschaft (DE); Werner Mettken, Hallenberg (DE)

(73) Assignee: Deutsche Telekom AG, Bonn (DE)

( * ) Notice: Subject to any disclaimer, the term of this patent is extended or adjusted under 35 U.S.C. 154(b) by 1109 days.

(21) Appl. No.: 10/296,093

(22) PCT Filed: May 10, 2001

(86) PCT No.: PCT/EP01/05342
§ 371 (c)(1),
(2), (4) Date: Nov. 22, 2002

(87) PCT Pub. No.: WO01/90855
PCT Pub. Date: Nov. 29, 2001

(65) Prior Publication Data
US 2003/0188181 A1 Oct. 2, 2003

(30) Foreign Application Priority Data
May 24, 2000 (DE) .................................. 100 25 626

(51) Int. Cl.
*G06F 21/24* (2006.01)
*G06F 21/00* (2006.01)
*G06F 21/22* (2006.01)
*G06F 12/14* (2006.01)

(52) U.S. Cl. ........ 713/193; 713/189; 711/161; 711/162; 711/164; 711/154; 707/812; 707/821; 707/674; 707/822; 380/277; 380/286; 709/217; 709/218

(58) Field of Classification Search .................. 308/262; 380/44–47, 286, 277; 713/193, 189; 711/161, 711/162, 164, 154; 707/812, 821, 674, 822
See application file for complete search history.

(56) References Cited

U.S. PATENT DOCUMENTS
5,495,533 A  2/1996  Linehan et al. ................. 380/21
(Continued)

FOREIGN PATENT DOCUMENTS
EP  0647895  4/1995
(Continued)

OTHER PUBLICATIONS
Schneier, Bruce "Applied Cryptography 2nd Edition" John Wiley & Sons, Inc. 1996. Pg. 173.*
(Continued)

*Primary Examiner* — Syed A. Zia
(74) *Attorney, Agent, or Firm* — Leydig, Voit & Mayer, Ltd.

(57) ABSTRACT

The aim of the invention is to provide a means of encrypting company-related data which also ensures that the data can be reproduced if the key is lost. To this end, the invention provides a method or an information processing system in which a key for a symmetrical encryption method is allocated to a user (4) for encrypting the data. Allocation information associating the key with the predetermined data to be encrypted and/or the user (4) is stored and can only be accessed by an authorised third party. If necessary, the key used for the particular data can be determined and the encrypted data reproduced, i.e. rendered readable, by this authorized third party. The allocation information, associating a particular key with an element identifying the predetermined data or a user identifier, can be stored in the information processing system in a predetermined manner or be created following a request for the allocation of a key.

15 Claims, 1 Drawing Sheet

U.S. PATENT DOCUMENTS

Figure 1:
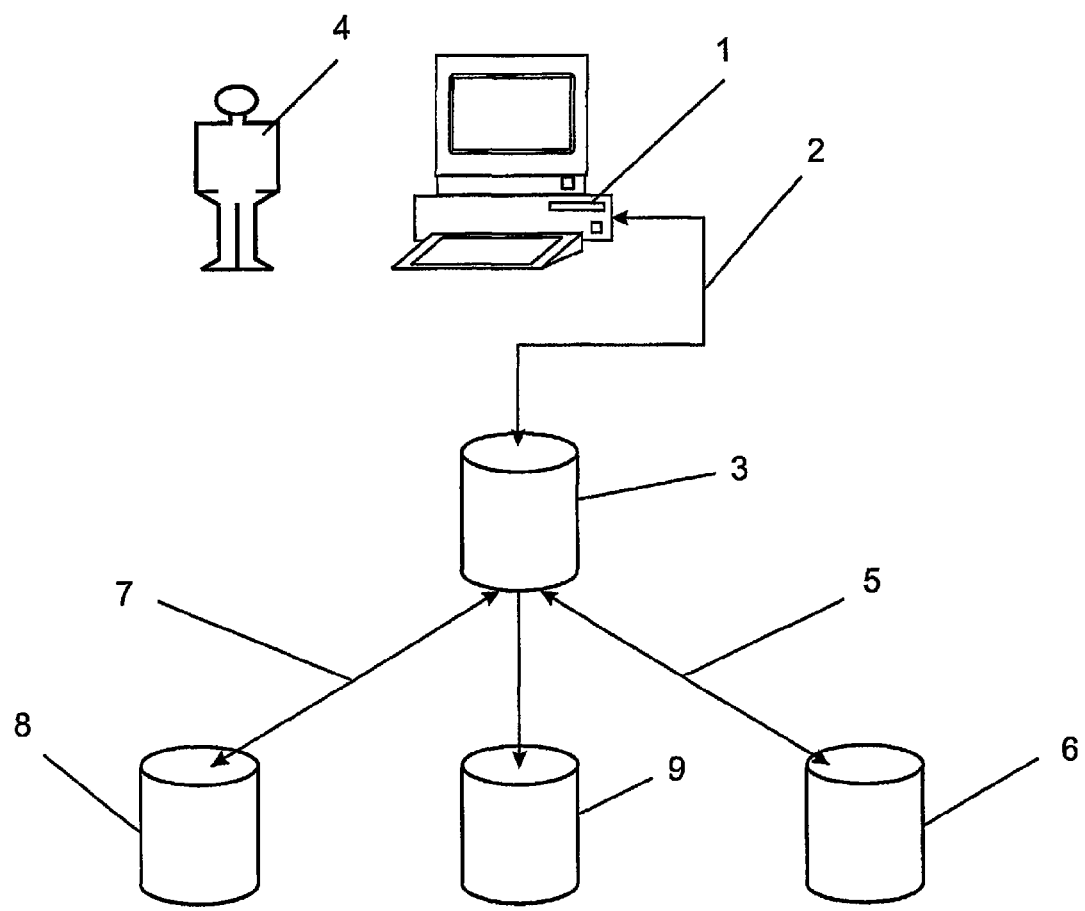

| | | | | |
|---|---|---|---|---|
| 5,623,546 | A | * | 4/1997 | Hardy et al. ............... 713/193 |
| 5,802,175 | A | | 9/1998 | Kara |
| 5,818,936 | A | | 10/1998 | Mashayekhi ............... 380/25 |
| 5,991,406 | A | * | 11/1999 | Lipner et al. ............... 380/286 |
| 6,044,388 | A | * | 3/2000 | DeBellis et al. ............ 708/254 |
| 6,185,678 | B1 | * | 2/2001 | Arbaugh et al. ............... 713/2 |
| 6,185,685 | B1 | * | 2/2001 | Morgan et al. ............... 713/183 |
| 6,549,626 | B1 | * | 4/2003 | Al-Salqan ............... 380/286 |
| 6,584,567 | B1 | * | 6/2003 | Bellwood et al. ............... 713/171 |
| 6,618,807 | B1 | * | 9/2003 | Wang et al. ............... 713/189 |
| 6,754,349 | B1 | * | 6/2004 | Arthan ............... 380/286 |
| 6,775,382 | B1 | * | 8/2004 | Al-Salqan ............... 380/286 |
| 6,920,563 | B2 | * | 7/2005 | Kohl et al. ............... 713/189 |
| 7,050,589 | B2 | * | 5/2006 | Kwan ............... 380/286 |
| 7,099,477 | B2 | * | 8/2006 | Bade et al. ............... 380/279 |
| 7,162,037 | B1 | * | 1/2007 | Schwenk ............... 380/286 |
| 7,441,116 | B2 | * | 10/2008 | Cheng ............... 713/162 |
| 2001/0010723 | A1 | * | 8/2001 | Pinkas ............... 380/286 |
| 2001/0036276 | A1 | * | 11/2001 | Ober et al. ............... 380/286 |
| 2001/0050990 | A1 | * | 12/2001 | Sudia ............... 380/286 |
| 2004/0139329 | A1 | * | 7/2004 | Abdallah et al. ............... 713/182 |
| 2004/0205362 | A1 | * | 10/2004 | Catherman et al. ............... 713/300 |
| 2008/0232598 | A1 | * | 9/2008 | Vennelakanti et al. ............... 380/279 |

FOREIGN PATENT DOCUMENTS

| | | |
|---|---|---|
| EP | 0709760 | 5/1996 |
| EP | 0774715 | 5/1997 |
| WO | WO 2004054208 A1 * | 6/2004 |

OTHER PUBLICATIONS

Dawson, E., Clark, A., and Looi, M. 2000. Key management in a non-trusted distributed environment. Future Gener. Comput. Syst. 16, 4 (Feb. 2000), 319-329. DOI= http://dx.doi.org/10.1016/S0167-739X(99)00056-4.*

A.J. Menezes, P.C. van Oorschot, S.A. Vanstone. "Handbook of Applied Cryptography" (Oct. 1996). CRC Press. Sections 12.5.2: Protocols combining PK encryption and signatures.*

Computer Networks, Third Edition, Andrew S. Tanenbaum, Vrije Universiteit, Amsterdam, The Netherlands, Prentice Hall PTR 1998.

* cited by examiner

ENCRYPTION OF DATA TO BE STORED IN AN INFORMATION PROCESSING SYSTEM

CROSS-REFERENCE TO RELATED APPLICATIONS

This application is a U.S. National Stage Application under 35 U.S.C. §371 of PCT International Application No. PCT/EP01/05342, filed May 10, 2001, which claims priority to German Patent Application No, 100 25 626.0, filed May 24, 2000. Each of these applications is hereby incorporated by reference as if set forth in its entirety.

The present invention relates to a method for allocating at least one encryption parameter according to the definition of the species in claim 1 and to an information processing system for carrying out this method.

In today's information age, data security is of elemental importance. This concerns both the recoverability of data which is stored on storage media and the restriction of the knowledge of the information which is given in the data to a predetermined group of people. To prevent such predetermined data from being read by unauthorized persons, it is stored in encrypted form. To this end, generally, known and standardized cryptographic methods are used in which the data is converted by predetermined functions, the functions being parameterized by a so-called "key". In symmetric encryption methods, the key for encrypting the data is also used to decrypt the cipher data Examples of symmetric cryptographic algorithms include the DES (Data Encryption Standard) and IDEA (International Data Encryption Algorithm). As opposed to this, in asymmetric encryption methods, a so-called "private key" is used to decrypt the cipher data, the private key differing from the so-called "public key" which is used to encrypt the data and is made known to the public. One of the keys for the asymmetric encryption method cannot be recovered from the respective other key with justifiable effort. Since symmetric methods allow encryption to be performed about 100 to 1000 times faster than with asymmetric methods, generally symmetric encryption methods are frequently used for encrypting larger data volumes, for example, data files.

Also known in the field are protocols in which a so-called "session key" is established between communication partners for online encryption, the session key being used in the communication to encrypt the information to be exchanged and being voided upon completion of the communication. In this context, the symmetric key can generally be created and transmitted to both communication partners by a so-called "key distribution center", which is established in US standard FED-STD-1037C for defining the concept of "key distribution center (KDC)".

An overview on cryptology is given, for example, in the book "Computer Networks" by Andrew S. Tannenbaum, 3rd Edition, Prentice Hall, 1999, pages 613 ff.

Companies having a multitude of employees who are connected to the company's computer network have to see that the predetermined data is stored in encrypted form in the system but, at the same time, they have to ensure that this data can be recovered, i.e., made accessible again at any time. Therefore, it is not sufficient if one person in charge of such data stores this data in encrypted form in the system since, especially when personnel changes or perhaps even the key is lost, the recovery of this data cannot be guaranteed. For this purpose, certain encryption methods offer a supervisor the possibility of recovering the encrypted data in spite of the unknown key. In a further approach, the private key of the respective user is copied internally within the company to be able to recover this data, if necessary.

As a rule, both approaches always offer the company the possibility of both recovering its stored encrypted data and of tracking the encrypted communication of the user in the company's information processing system since in both cases, generally, the public key of the user is used for encryption, the cipher data being recovered with the private key of the user. However, with regard to data security and the personal rights of the respective user, both approaches are at least questionable. On the other hand, for example, it can be of utmost importance for a company to recover and make accessible information which is stored in the information processing system of the company. This might only be possible with considerable organizational effort or increased complexity of use. In the case that the regulations fail, or fail to be observed, it is generally impossible to recover the stored information which, in the worst case, can put the company's existence at risk.

The problem underlying the present invention is therefore to take into account both data security and the personal rights of the user when encrypting data to be stored while bearing in mind the company's needs for recoverability of the encrypted data.

This problem is already solved by a method according to claim 1 for allocating at least one encryption parameter to at least one user for encryption of data to be stored in an information processing system and by an information processing system according to claim 10 for carrying out such a method. According to that, if necessary, a data processing system 1 requests at least one encryption parameter whereupon at least one encryption parameter for a symmetric encryption method is determined in response to the request and transmitted subsequently. By generating an allocation information which associates the at least one encryption parameter with the data to be encrypted and stored and/or with the user, and storing this allocation information in such a manner that it is accessible to an authorized third party, the encryption parameter used for the respective data is determinable by the third party for later decryption of the data, if necessary, which allows the data to be recovered for the company.

In this context, according to the present invention, the allocation information is generated and stored either already before or after the corresponding request is emitted; in this sense, the order of the process steps specified in Claim 1 is not always chronological.

Advantageous refinements are the subject matter of the dependent claims.

The allocation information can be stored in the information processing system in many ways, in particular, in the form of a table. For example, the storage date of the data to be stored, the file name, information on of the storage location, the user himself/herself, the user's membership in a given user group or company area, the data processing system 1 from which the user sends his/her request, etc., can be allocated, as the respective identifier, to a certain key. Thus, when generating the allocation information, at least one identifier of the data to be stored and/or of the user is/are linked to the at least one encryption parameter. Knowing this allocation information, it is possible for the authorized third party to determine the respective encryption parameter with which the data to be stored was encrypted. In the simplest case, the encryption parameter can be a key for a predetermined symmetric encryption method. According to the present invention, this key is not only known to the entity which has requested and used the key for encrypting the data but is also stored in a different location in the information processing system and therefore can later be used to recover the encrypted data which, in particular, is stored on a non-volatile storage medium.

On the other hand, the communication of the user within the information processing system is not impaired by the transmission of the symmetric encryption parameter with regard to data security and his/her personal rights because the encryption parameter used in the information processing system for encrypting the respective data to be stored has no relation to the communication of the user within the information processing system. According to the present invention, the user can either be a person or else a process running on the data processing system 1.

The method can be applied to arbitrary information processing systems, in particular, to computer networks, regardless of their size, transmission technology or topology.

As mentioned, it is within the scope of the present invention either to keep available the described allocation information in the information processing system for requests for encryption parameters or to store this allocation information in response to the request only after the encryption parameter has been determined. In the first case, it can be determined that a particular user is allocated the same key at all times or over a given period of time. In the second case, it is possible, for example, to generate a key in response to a request using a random method and to subsequently store the key together with a pointer pointing to the encrypted data or along with one of the described identifiers.

For example, each time data is to be encrypted and stored in an information processing system, the computer allocated to the user can dispatch a request to a predetermined server within the information processing system, either automatically or in response to an instruction of the user, and is assigned an encryption parameter by the server for encrypting the data to be stored, the encryption parameter making the data to be stored inaccessible to unauthorized persons before it is stored on a non-volatile medium.

To protect the communication between the user and the server, the information to be exchanged can be protected using an asymmetric encryption method. In this connection, the server uses a public key of the user, and the user uses his/her own private key, which is associated with the public key, to recover the transmitted information. Thus, it is possible, for example, to have the entire communication take place asymmetrically or to use an asymmetric encryption method to exchange a communication key for a symmetric encryption method for protecting the communication between the user and the server. In this context, the at least one transmitted encryption parameter for the symmetric encryption method for protecting the data to be stored is transmitted in a communication session which itself is protected with a symmetric encryption method. Moreover, it is at the same time possible to authenticate the user with the aid of the asymmetric encryption method in that the user at least partially encrypts his/her request to the server with his/her private key, the server being able to recognize that the request has indeed been transmitted by the particular user by decrypting the encrypted part with the known public key of the user.

To allow the request to be differentiated by an encryption parameter, provision can be made for the request to be processed in response to information which concerns the data or the user and is stored in the information processing system, it being possible, for example, to load relevant information which is stored in a data base. This information, in particular, specific identifiers of the data to be stored itself or of the user, can be compared with those of the allocation information when determining the encryption parameter. If a particular identifier is present, then the required encryption parameter can be unambiguously derived from the allocation information. It is, of course, also possible that the information which concerns a user and is stored in the system, directly assigns an encryption parameter to the user, i.e., that the information on the user can also include the allocation information. According to the present invention, this information can only be accessed by authorized third parties.

To provide information on the respective user, it is possible, for example, to load a certificate for the user which is stored in the information processing system, the certificate, in addition to a public key of the user for an asymmetric encryption method, including further information concerning the user as, for example, with respect to involvement with projects, persons, work groups and/or a level of secrecy. According to the present invention, the at least one encryption parameter can be transmitted to be prepared, for example, depending on this information. As mentioned above, the public key stored in the certificate can be used, on one hand, to authenticate the user and, on the other hand, to encrypt the symmetric encryption parameter which is assigned to and to be transmitted to the user.

To be independent of subjective assessments with regard to the data's secrecy requirements, the system can decide automatically and in a predefined manner, in particular, without any effort on the part of the user, whether the data should be stored in encrypted form and therefore a corresponding encryption parameter must be assigned. In this connection, depending on the specific embodiment, a differentiation can be made with respect to the respective data, the data processing system 1 which dispatches the requests, or the user. If the data itself, or the work of the user is classified as requiring secrecy in a predetermined manner, then the system assigns at least one encryption parameter, in particular, a key.

The method according to the present invention can be used in an information processing system particularly efficiently if the processing of the respective request, the determination of the at least one encryption parameter, the generation and/or the storage of the allocation information that allocates the at least one encryption parameter to the respective data to be stored and/or to the user, are carried out centrally in the information processing system in respective devices. Each time data is to be stored in some location in the information processing system, the respective client dispatches a request to the predetermined central entity for allocation of at least one encryption parameter. It is then centrally decided for the information processing system whether the data in question is to be stored in encrypted form in order to then determine and transmit at least one encryption parameter, in particular, a key, if necessary.

The sequence for determining the key with which information was encrypted in a predetermined data file stored on a non-volatile storage medium is very similar to that for assigning the key. In case a private key is lost, the authorized third party can send a request to a key server to determine the key; at least one identifier of the data file and/or or of the user who stored the data file in encrypted form being transmitted to the key server for identification of the predetermined data file. The required key is determined in response to the request by querying allocation information which is stored in the information processing system and in which the key is uniquely allocated to the at least one identifier of the data file and/or of the user. This allocation information can be the allocation information that was used for allocating the key. Subsequently, the determined key can be transmitted to the third party. Knowing the key, the information saved in the stored data file can be recovered by the third party through decryption.

The objective mentioned above is also achieved by the features of claim 10.

An expedient refinement is the subject matter of independent claim 11.

In the following, the present invention will be explained by the description of several specific embodiments with reference to the drawing.

In this context, FIG. 1 is a schematic diagram of a portion of an information processing system for carrying out the method according to the present invention.

FIG. 1 shows a portion of an exemplary information processing system in which the present invention is implemented. A plurality of personal computers and workstations are connected to a LAN (Local Area Network) and, via the network, to a key server 3 which is connected to various data base servers 8, 9, 6. Of the personal computers and workstations, only one workstation computer, which can be operated by a user 4, is shown in FIG. 1 for the sake of simpler presentation. User data can be stored either locally or on special file servers on the network.

Each user authenticates himself/herself with a chip card and an associated PIN (Personal Identification Number), it being possible for the chip card to be read on any of the connected personal computers or workstations. The chip card has stored on it a private key for the asymmetric RSA encryption method, which is used by the respective user to decrypt encrypted messages that are sent to him/her. In the present case, the asymmetric encryption method is used to exchange a session key for encrypting the communication data between the communication partners in the information processing system. This session key is a key which is used by both sides for the predetermined symmetric encryption method. The private key of user 4 is recorded only his/her chip card and cannot be recovered, for example, when the card is lost.

The method according to the present invention will be explained below. It is assumed that user 4 is logged on to the depicted information processing system of his/her company and initiates a storage operation for data he/she has worked on. Depending on the embodiment of the present invention, the storage command causes a request to be dispatched from workstation computer to key server 3, either automatically or in response to an initiative of the user. In this sense, the workstation computer of the user operates as a client via which user 4 sends a request to server 3. See FIG. 1 in which this client-server relationship is shown by double arrow 2. In response to the request, key server 3 transmits a key determined by it for the predetermined symmetric Triple-DES encryption method. The client uses the key received from key server 3 to encrypt the data to be stored and stores the cipher data on its local hard disk. To be able to later access the stored data, the symmetric key used for encryption is also stored together with the encrypted data to be stored. To prevent the data to be stored including the also stored key from being made visible by a third party without authority, the symmetric key is asymmetrically encrypted with the public key of user 4. Therefore, the stored file is composed of two parts, the symmetrically encrypted data to be stored and the asymmetrically encrypted symmetric key for decrypting the data. In cases where a single user is always assigned the same key for encryption of data to be stored, the symmetric key, which is encrypted with the asymmetric key of the user, needs to be stored on the local computer of the user only once.

In another embodiment of the present invention, all data of the system is kept centrally on file servers. In this context, it is also possible that the file server itself emits the request as a client to key server 3, and that the data is encrypted by the file server with the transmitted key prior to storage.

In both cases, the key with which the data to be stored was encrypted can be decrypted by the user using his/her private key, ultimately allowing him/her to read the data again.

After key server 3 has received the request from the workstation computer of user 4, the key server can process the request depending on the specific system settings. In this context, the request can be processed as a function of information which is stored in the system and which relates to the data to be stored and/or to the user. In the example described, key server 3 dispatches a request to data base server 8 which, in the present case, is an X.500 server 8. The X.500 server provides certificates for all users of the information processing system. Such a certificate for a particular user can have stored in it the public key for the above mentioned asymmetric encryption method and specific information on the secrecy rating, the group membership, and on the functional title of the user. The mentioned identifiers of the user are transmitted by X.500 server 8 to key server 3. The described communication between the two devices 3, 8 is indicated in FIG. 1 by double arrow 7. After communication with the X.500 server, key server 3 dispatches a request to data base server 6, which represents a policy server. Policy server 6 has stored on it the allocation information in the form of rules for determining the symmetric key. In the present case, user 4 is allocated to a specific group of people because of his/her certificate, wherefore he/she is assigned a predetermined key for the symmetric encryption method on the basis of the rules loaded by policy server 6. To prevent the key which is transmitted to workstation computer 4 from being intercepted, key server 3 encrypts the symmetric key according to the predetermined asymmetric RSA method with the public key received from X.500 server 8. In the workstation computer, i.e., the client, the symmetric key is recovered with the aid of the private key of user 4 and used for encrypting the data to be stored.

The hardware around key server 3, featuring servers 8, 9, 6 including the data stored there, is subject to the company's highest level of secrecy. Through suitable measures, it is ensured that the data stored there can only be accessed by authorized third parties.

To be able to recover the encrypted data stored on the local workstation computer, if necessary, without knowing the private key of user 4, the symmetric key, which is sent to the client, is additionally stored on data base server 9, which is a special backup key server, together with a pointer to the data file stored on the local computer. If the private key of user 4 is lost and it is necessary to access the data stored in the data file, the allocated symmetric key, which can be used to decrypt the information stored on the workstation computer, can be determined by the authorized third party by the file name on server 9.

In another embodiment of the present invention, backup key server 9 may be omitted. If the file management of the information processing system allows a stored file containing encrypted data to be uniquely associated with a specific user, the symmetric key that was used to encrypt the data can be determined on the basis of the information on X.500 server 8 about this user and on the basis of the information on policy server 6 about the allocation rules, provided that the key was allocated only on the basis of identifiers of the user.

In a further embodiment, an automatic allocation is based on the recognition of a predetermined file extension, which identifies the type of the data processed by user 4 as being material to the company. If user 4 attempts to store such a data file, a key is automatically requested by work station computer 1 and assigned thereto by key server 3 for encryption of the data.

What is claimed is:

1. A method for allocating at least one encryption parameter to at least one user for encryption of data to be stored in an information processing system, the method comprising:
   requesting the at least one encryption parameter by a data processing system which encrypts the data to be stored, wherein the data to be stored is generated by the at least one user using the data processing system;
   determining, by a key server device, the at least one encryption parameter in response to the request; the at least one encryption parameter being a symmetric encryption parameter;
   transmitting the at least one encryption parameter to the data processing system;
   generating, by a database server device, an allocation information configured to associate the at least one encryption parameter with an identifier of the data processing system;
   associating the identifier with the data to be stored or the user; and
   storing, by at least one of a backup key server device and a policy server device, the allocation information so as to be accessible to at least one authorized third party.

2. The method as recited in claim 1 wherein the generating the allocation information is performed by linking to the at least one encryption parameter to the identifier.

3. The method as recited in claim 1 further comprising:
   encrypting the at least one encryption parameter using an asymmetric encryption method so as to provide an asymmetrically encrypted symmetric encryption parameter before the transmitting; and
   decrypting the asymmetrically encrypted symmetric encryption parameter in the data processing system using a private key allocated to the user.

4. The method as recited in claim 1 wherein the determining the at least one encryption parameter is performed using information stored in the information processing system.

5. The method as recited in claim 4 wherein the information relates to the identifier.

6. The method as recited in claim 1 wherein the determining the at least one encryption parameter is performed independently of the data to be stored, and wherein the storing the allocation information is performed subsequent to the determining.

7. The method as recited in claim 1 wherein the determining the at least one encryption parameter is performed independently of the user, and wherein the storing the allocation information is performed subsequent to the determining.

8. The method as recited in claim 1 further comprising:
   checking access rights of the user to the information processing system prior to the determining the at least one encryption parameter; and
   when the access rights exist, retrieving a certificate allocated to the user and capable of including user-specific information.

9. The method as recited in claim 8 wherein the user-specific information includes a public key of the user.

10. The method as recited in claim 1 wherein at least two of a processing of the requesting of the at least one encryption parameter, the determining of the at least one encryption parameter and storing of the allocation information are performed in respective separate devices of the information processing system.

11. The method as recited in claim 1 wherein the requesting the at least one encryption parameter is performed automatically by the data processing system based on a type of the data to be stored.

12. The method as recited in claim 1 wherein the requesting the at least one encryption parameter is performed by the user with the data processing system.

13. An information processing system comprising:
   at least one data processing system responsible for encrypting a data to be stored, the data processing system being configured to request at least one symmetric encryption parameter, wherein the data is generated by a user using the data processing system;
   a key server device connected to the at least one data processing system and configured to process the request for the at least one symmetric encryption parameter, to determine the at least one symmetric encryption parameter in response to the request, and to transmit the at least one symmetric encryption parameter to the data processing system;
   a database server device configured to generate an allocation information associating the at least one symmetric encryption parameter with an identifier of the data processing system, wherein the identifier is associated with the data to be stored or the user; and
   at least one of a backup key server device and a policy server device configured to store the generated allocation information so as to be accessible to at least one authorized third party.

14. The information processing system as recited in claim 13 wherein the at least one of a backup key server device and a policy server device includes a storage device allocated to the at least one data processing system configured to store a type of the data to be stored, the at least one data processing system being configured to request the at least one symmetric encryption parameter based on the type of the data to be stored.

15. A method for allocating at least one encryption parameter to at least one user for encryption of data to be stored in an information processing system, the method comprising:
   requesting the at least one encryption parameter by a data processing system which encrypts the data to be stored, wherein the data to be stored is generated by the at least one user using the data processing system;
   determining, by a key server device, the at least one encryption parameter in response to the request, the at least one encryption parameter being a symmetric encryption parameter;
   transmitting the at least one encryption parameter to the data processing system;
   generating, by a database server device, an allocation information configured to associate the at least one encryption parameter with an identifier of the data processing system;
   storing, by at least one of a backup key server device and a policy server device, the allocation information so as to be accessible to at least one authorized third party;
   encrypting the at least one encryption parameter using an asymmetric encryption method so as to provide an asymmetrically encrypted symmetric encryption parameter before the transmitting; and
   decrypting the asymmetrically encrypted symmetric encryption parameter in the data processing system using a private key allocated to the user.

* * * * *